(12) United States Patent
Vlaar et al.

(10) Patent No.: US 7,573,223 B2
(45) Date of Patent: Aug. 11, 2009

(54) DEVICE FOR DEMARCATING AN AREA

(75) Inventors: Iwan Yves Vlaar, Rotterdam (NL);
Karel Van Den Berg, Bleskensgraaf (NL); Jan Martinus Van Kuilenburg, Wadenoyen (NL)

(73) Assignee: Lely Enterprises AG, Zug (CH)

( * ) Notice: Subject to any disclaimer, the term of this patent is extended or adjusted under 35 U.S.C. 154(b) by 0 days.

(21) Appl. No.: 11/487,475

(22) Filed: Jul. 17, 2006

(65) Prior Publication Data

US 2007/0018602 A1     Jan. 25, 2007

(30) Foreign Application Priority Data

Jul. 25, 2005  (NL)  .................................. 1029600

(51) Int. Cl.
*G05D 1/00* (2006.01)
(52) U.S. Cl. .................. 318/587; 318/580; 242/557
(58) Field of Classification Search ............. 318/587, 318/580; 242/557
See application file for complete search history.

(56) References Cited

U.S. PATENT DOCUMENTS

| 4,643,251 | A | * | 2/1987 | Ziccardi et al. | ............. | 152/223 |
| 5,568,926 | A | * | 10/1996 | Kaptein | ...................... | 273/359 |
| 5,662,313 | A | * | 9/1997 | Forrester | ...................... | 256/11 |
| 6,062,165 | A | * | 5/2000 | Sieling | .................... | 119/14.03 |
| 6,065,714 | A | * | 5/2000 | Fondacaro | ................. | 242/557 |
| 6,142,102 | A | * | 11/2000 | Mack et al. | ................. | 119/720 |
| 6,302,156 | B1 | * | 10/2001 | Lardet et al. | .................. | 140/16 |
| 7,011,269 | B1 | * | 3/2006 | Chouinard et al. | .......... | 242/557 |

FOREIGN PATENT DOCUMENTS

| DE | 4215714 | A |   | 11/1993 |
| DE | 4215714 | A | * | 11/1993 |

* cited by examiner

*Primary Examiner*—Bentsu Ro
*Assistant Examiner*—David S Luo
(74) *Attorney, Agent, or Firm*—David P. Owen; Howrey LLP

(57) ABSTRACT

A device for demarcating an area, in particular for limiting the freedom of movement of animals walking about freely, is provided with a demarcating element (2) that is connected with a first vehicle (1) and with at least a second vehicle (10). At least the first vehicle (1) is provided with a tracking arm structure (3) for making it possible to track a guide element (4) disposed in the area, such as for example a wire fencing. The demarcating element (2) is disposed in a stretched position between the two vehicles (1, 10) in such a way that the demarcating element (2) does not exert force on the tracking arm structure (3).

28 Claims, 3 Drawing Sheets

DEVICE FOR DEMARCATING AN AREA

CROSS REFERENCE TO RELATED APPLICATIONS

This application claims priority from Dutch application number 1029600 filed on 25 Jul. 2005, the contents of which are hereby incorporated by reference in their entirety.

BACKGROUND OF THE INVENTION

1. Field of the Invention

The invention relates generally to a device for demarcating an area, in particular for limiting the freedom of movement of animals walking about freely.

2. Description of the Related Art

Devices are known for demarcating areas, in which a demarcating element is connected between a first vehicle and at least a second vehicle. At least the first vehicle is provided with a tracking arm structure for making it possible to track a guide element disposed in the area, such as for example a wire fencing. A device of this type is known from German Offenlegungsschrift DE 42 15 714. The known device comprises two tracked vehicles that are each provided with a tracking arm structure between which two wires are stretched for demarcating an area. The tracking arm structures each comprise a hook that can be hooked on a fencing. This known device has the disadvantage that the stretched wires between the two vehicles are directly connected with the tracking arm structures, which results in great forces being exerted on the tracking arm structures when relatively long wires are stretched between the vehicles. Also the forces exerted by the tracking arm structures on the wire fencings by means of the hooks can lead to the wire fencing breaking in those cases where excess loads are exerted upon it.

A further device is known from U.S. Pat. No. 6,062,165 which discloses a farming system comprising a circular plot of land. Electric fences defining a wedge shaped paddock may be moved around the plot. In one embodiment a vehicle supporting an end of one electric fence follows a circular perimeter fence around the plot. The vehicle comprises a tension device for applying tension to the electric fence and also a probe for following the perimeter fence. The probe is mounted on a pivotal arm, which is biased against the fence by a spring mounted on the vehicle. Pivoting of the arm steers the vehicle via a steering arm and tie rod mechanism. As mentioned above, such lateral biasing forces acting on a guide wire have been found generally undesirable, requiring more substantial structures to support the guide wire.

BRIEF SUMMARY OF THE INVENTION

The present invention addresses these problems by providing a tracking vehicle for supporting a demarcating element for demarcating an area, the tracking vehicle comprising a tracking arm structure for tracking a guide wire disposed in or adjacent to the area, wherein a tension force is exerted by the demarcating element on the tracking vehicle in a lateral direction generally perpendicular to the guide wire and wherein the tracking arm structure exerts substantially no force on the guide wire in the lateral direction. Owing to the fact that the stretched wire or wires of the demarcating element are tensioned to the vehicle and not to the tracking arm structure, it is possible to stretch relatively long wires and yet apply a tracking arm structure of a relatively light construction that exerts almost no force on the guide wire. Most preferably, the portion of the tracking arm that follows the guide wire is freely movable with respect to the vehicle. In this context, the term "freely movable" is intended to designate that the tracking arm is not biased against the guide wire in the lateral direction. In the present context, although reference is made to a "guide wire", it is understood that this shall also encompass rods, pipes, bars, filaments and other equivalent elongate guide elements.

According to a further inventive feature, the vehicle has a length in the direction of the guide wire and the tension force is exerted at an equilibrium position along the length of the vehicle. For a wheeled vehicle having front and rear wheels, the tension force, seen in plan view, is exerted in the middle between the wheels. This results in that each wheel experiences an almost equal moment that is exerted on the vehicle by the tension force, which has the advantage that the vehicle is better controllable during driving. In order to provide the wheels of the vehicle with sufficient grip on the ground, according to the invention, the wheels are designed as cage wheels, the running surface of the cage wheels being constituted by spaced apart, circularly curved strips. The circularly curved strips further have the advantage that the running surface of the wheels is approximately equal to the running surface of a normal pneumatic tyre, which is advantageous to the maneuverability of the vehicle.

According to again another inventive feature, the vehicle comprises two pairs of cage wheels that are drivable independently of each other, each pair of cage wheels comprising a drive chain. Owing to the fact that the wheels can be driven in pairs, it is possible to control the vehicle with the aid of the separate drive of the wheel pairs. Furthermore, in relation to for example a drive belt, the drive chain has the advantage of demonstrating hardly any slip or no slip at all, which enables a very accurate drive and control.

According to again another aspect of the invention, at least the first vehicle is provided with stretching means, the stretching means comprising a reel or other appropriate rolling means drivable by an electric motor or the like for rolling and unrolling the demarcating element. The reel is preferably connected to the vehicle in a first suspension point by means of a load cell and in a second suspension point by means of a leaf spring. The advantage of using a leaf spring suspension is a very predictable load of an accurate power measurement in the load cell.

In order to make it possible for the demarcating element to rotate relative to the vehicle, according to a further inventive feature, the first comprises a guiding piece that is rotatable about a vertical axis and along which the demarcating element is guided to the reel.

Although the invention may be performed with a single vehicle, e.g. operating along a circular path, according to again another inventive feature, a second or further vehicle may also be provided and the demarcating element may be tensioned between the vehicles. The second vehicle may also comprise a guiding piece that is rotatable about a vertical axis. In order to prevent the guide wire and/or parts of the vehicle from breaking down or becoming damaged by excess tension, according to an inventive feature, the guiding piece comprises a break-back device to which the demarcating element is attachable. In a preferred embodiment according to the invention, the break-back device is designed as a spring break-back device comprising preferably a screw-shaped bending spring with a circular section. In order to make it possible to measure the stretching force exerted by the demarcating element on a vehicle, according to an inventive feature, the guiding piece is provided with a load cell. In order to make it possible to measure the angular rotation of the demarcating element relative to the vehicles, according to an inventive feature, the guiding piece comprises an angle measuring instrument with the aid of which the angular rotation about the vertical axis can be determined.

According to again another aspect of the invention, the second vehicle is also provided with a tracking arm structure for making it possible to track a second guide wire disposed in the area.

According to a further inventive feature, the tracking arm structure used on either the tracking vehicle or the second vehicle or both, is provided with a tracking element for tracking the guide wire. According to a further inventive feature, the tracking element is designed in such a way that it engages the guide wire at least two spaced apart points of engagement. According to a further inventive feature, at said points of engagement, the tracking element is provided with bracket-shaped elements for enclosing the guide wire. According to a further inventive feature, each of the bracket-shaped elements is provided at its lower side with a closing element that can be opened against spring action. Said closing element makes it possible for the tracking arm structure to pass fastening elements of a guide wire disposed in the area.

According to again another aspect of the invention, the tracking arm structure and preferably the tracking element is/are provided with one or more location determining sensors and/or approach sensors. With the aid of the location determining sensors and/or approach sensors it is possible, for example, to determine a calibration point or an end point on the guide wire.

According to another inventive feature, the tracking arm structure comprises a first arm portion that is connected with the frame of the vehicle so as to be rotatable about a horizontal axis. According to an inventive feature, the tracking arm structure comprises first angle measuring means with the aid of which the angular rotation of the first arm portion relative to the horizontal axis can be determined. According to again another inventive feature, the tracking element is connected with an end of the first arm portion so as to be rotatable about a first vertical axis. According to a further inventive feature, the tracking arm structure comprises second angle measuring means with the aid of which the angular rotation of the tracking means relative to the first vertical axis can be determined. According to a further aspect of the invention, the first arm portion is shiftably or slideably connected in relation to the frame of the vehicle.

According to again another inventive feature, the tracking arm structure comprises measuring means with the aid of which the distance and/or the shifting movement of the tracking means relative to the vehicle can be determined. According to another inventive feature, the measuring means comprise third angle measuring means.

In a preferred embodiment according to the invention, the first vehicle and preferably also the further vehicles are unmanned vehicles. With the aid of the tracking arm structure and the associated angle measuring means it is thus possible to make the vehicles drive along the guide element without intervention of operators. In order to prevent the unmanned vehicles from deviating from the route defined by the guide element, the tracking arm structure may be provided with protecting means that put the vehicle out of operation and/or generate an alarm when the tracking arm structure does not or does no longer co-operate in a proper way with the guide element. An appropriate controller may be provided for controlling operation of the vehicle on the basis of the relative position of the tracking arm structure and other signals or programs. The controller may be mounted on the vehicle or may be remotely located.

It will be obvious that the above-described tracking arm structure for tracking a guide element will also be applicable to other, preferably unmanned, vehicles that are not described in the present application.

BRIEF DESCRIPTION OF THE DRAWINGS

The features and advantages of the invention will be appreciated upon reference to the following drawings, in which.

DESCRIPTION OF ILLUSTRATIVE EMBODIMENTS

The following is a description of an embodiment of the invention, given by way of example only and with reference to the drawings.

Figure 1:
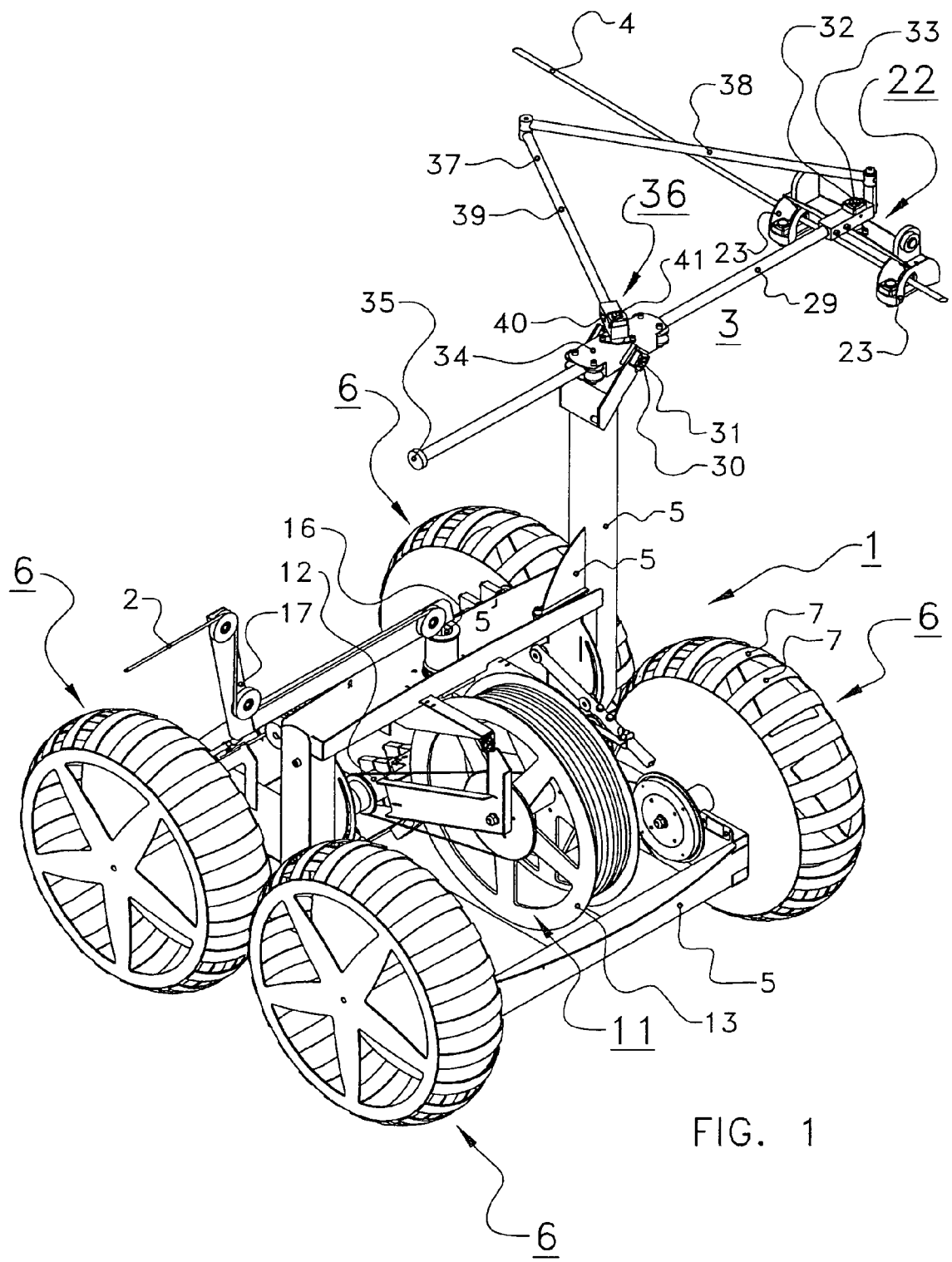
FIG. 1 shows a first unmanned vehicle with a tracking arm structure and a demarcating element according to the invention.

FIG. 1 shows a first unmanned vehicle 1 that is provided with a demarcating element 2 and a tracking arm structure 3 for making it possible to track a guide element 4 disposed in an area. In the present embodiment, both the demarcating element 2 and the guide element 4 are designed as wires that can be electrified. The first vehicle 1 comprises a frame structure 5 with four cage wheels 6. The cage wheels 6 have a running surface that is constituted by spaced apart, circularly curved strips 7. Both the left and the right pair of cage wheels 6 comprise a drive chain 8 that drives one pair of cage wheels 6 simultaneously by means of an electric step motor 9 that is disposed on the frame structure 5 for each pair of cage wheels 6 separately (see FIG. 3). By driving the electric step motors 9 simultaneously or independently of each other, the unmanned first vehicle 1 can be controlled. A controller (not shown) is provided on the vehicle or remotely for this purpose.

Figure 3:
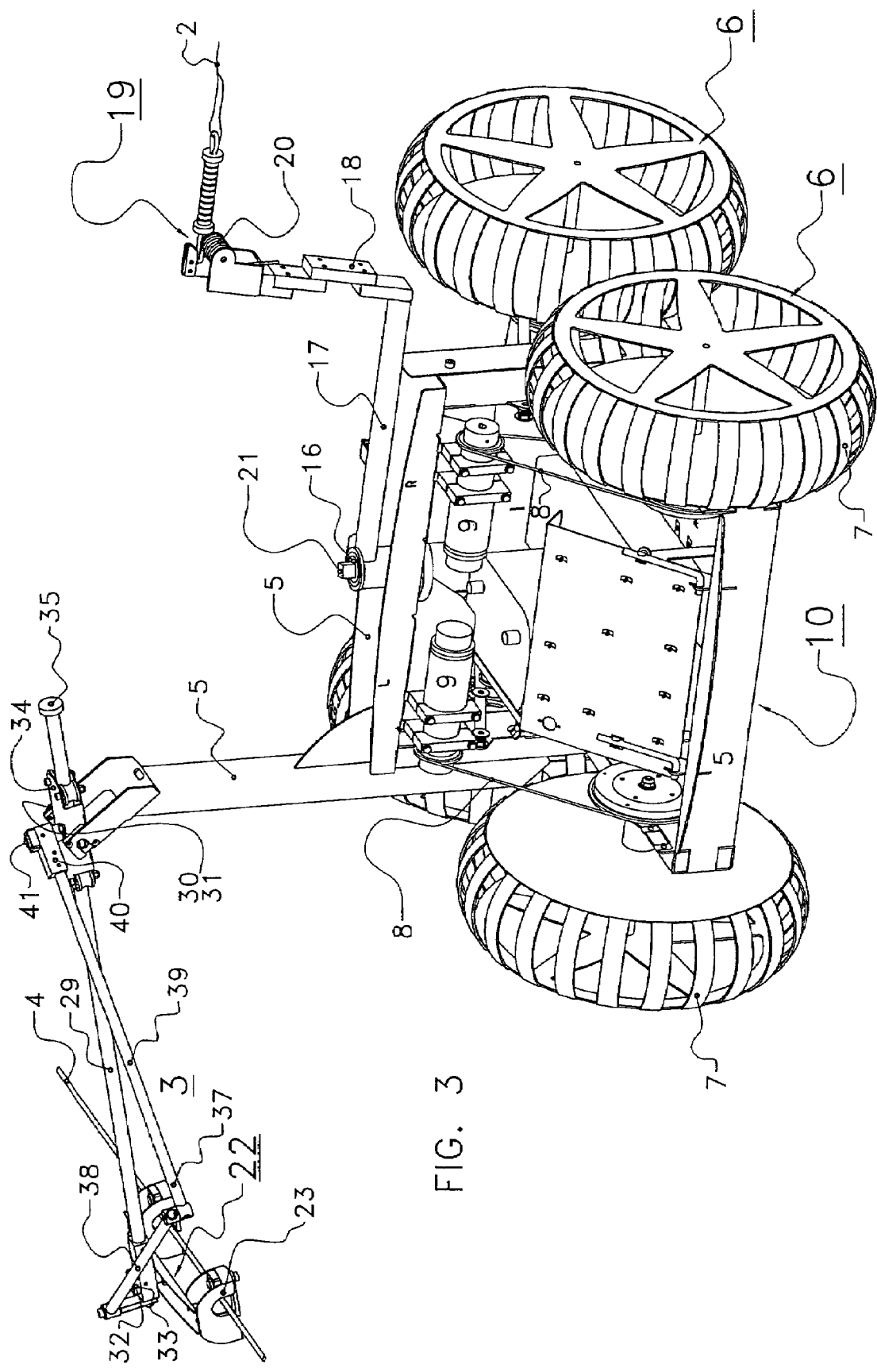
FIG. 3 shows a second unmanned vehicle with a tracking arm structure and the demarcating element according to the invention.

In order to make it possible to stretch the demarcating element 2 between a first vehicle 1 and a second unmanned vehicle 10 as shown in FIG. 3, the first vehicle 1 is provided with stretching means 11 for stretching the demarcating element 2 between the two vehicles. The stretching means 11 comprise rolling means 13 in the form of a reel or drum, drivable by an electric motor 12 for rolling and unrolling the demarcating element 2.

Figure 2:
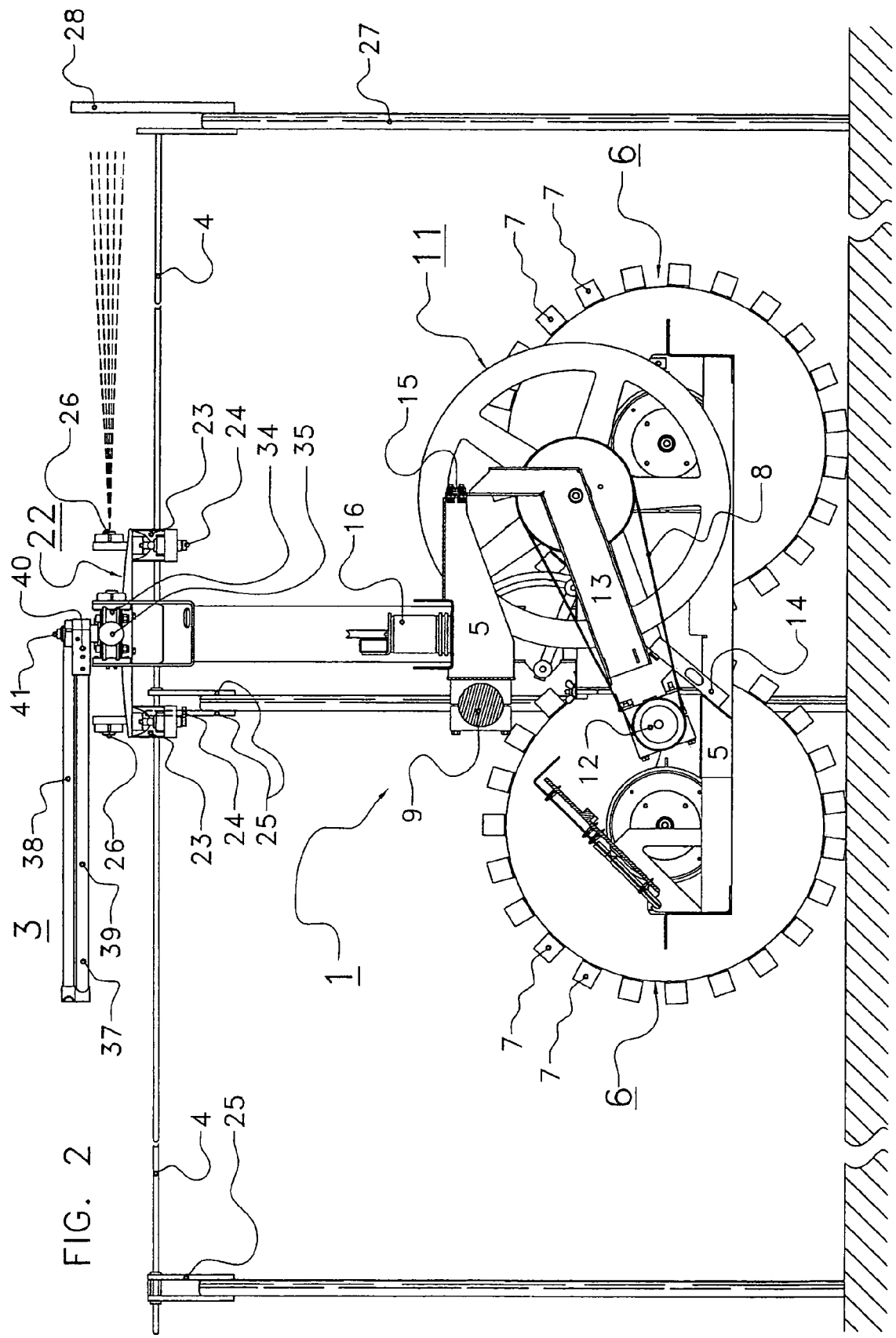
FIG. 2 is a cross-sectional view of the first vehicle according to FIG. 1.

As shown in FIG. 2, the rolling means 13 are connected with the frame structure 5 in a first suspension point by means of a load cell 14 and are connected with a further portion of the frame structure 5 in a second suspension point by means of a leaf spring 15. On the frame structure 5 there is further disposed a guiding piece 17 that is rotatable about a vertical axis 16 and along which the demarcating element 2 is guided to the rolling means 13. As the first vehicle 1 and the second vehicle 10, with the exception of the stretching means 11, are approximately identical, corresponding parts are designated by the same reference numerals.

As shown in FIG. 3, the guiding piece 17 is provided with a load cell 18 for determining the stretching force of the demarcating element 2 on the second vehicle 10. The end of the guiding piece 17 is further provided with a break-back device 19 to which the guide element 2 is attachable. In the present embodiment, the break-back device 19 is designed as a spring break-back device that comprises a screw-shaped bending spring 20 with a circular section. If the stretching force with which the demarcating element 2 is kept between the two vehicles 1, 10 exceeds a particular maximum, the eye-fastening will get out of the spring break-back device. It will be obvious that the eye-fastening can simply be reinserted into the spring break-back device by means of an operator, without the eye-fastening being damaged. The guiding piece 17 further comprises an angle measuring instrument 21 with the aid of which the angular rotation of the guiding piece 17 about the vertical axis 16 can be determined. If the angular rotation exceeds a previously determined maximum angle, the vehicle is not driven further in order to prevent the stretching force of the demarcating element from reaching a too high level. In case of the first vehicle 1, the same stretching force can be measured by means of the load cell 14 of the stretching means 11; also in this case the drive is stopped when said stretching force is exceeded.

As shown in FIG. 3, the second vehicle 10 also comprises a tracking arm structure 3 for making it possible to track a guide element 4 disposed in an area. The tracking arm structure 3 is provided with tracking means 22 for tracking the guide element 4. As shown in the figures, the tracking means 22 are designed in such a way that they engage the guide element 4 at least two spaced apart points of engagement. At said points of engagement, the tracking means 22 are provided with bracket-shaped elements 23 for enclosing the guide element 4. The bracket-shaped elements 23 are provided at their lower sides with a closing element 24 that can be opened against spring action. As shown in FIG. 2, said closing element 24 can be opened against spring action when the tracking means 22 pass, for example, a fastening 25 for fastening the guide element 4. As shown in FIG. 2, the tracking means 22 are provided with location determining sensors and/or approach sensors 26 that co-operate with, for example, a marking element 28 that is disposed on a fencing pole 27. In this manner it is possible, for example, for the vehicle to determine the end of the guide element 4 or to measure a particular calibration point for the vehicles 1, 10.

As shown in FIG. 1, the tracking arm structure comprises a first arm portion 29 that is connected with the frame 5 of the vehicle 1, 10 so as to be rotatable about a horizontal axis 30. Near the horizontal axis 30, there are disposed first angle measuring means 31 with the aid of which the angular rotation of the first arm portion 29 relative to the horizontal axis 30 can be determined. The tracking means 22 are connected with the end of the first arm portion 29 so as to be rotatable about a first vertical axis 32. Near the first vertical axis 32, there are disposed second angle measuring means 33 with the aid of which the angular rotation of the tracking means 22 relative to the first vertical axis 32 can be determined. As shown in FIG. 1, the first arm portion 29 is shiftably disposed in a roller bearing element 34 that is rotatable about the horizontal axis 30. In order to prevent the first arm portion 29 from possibly getting out of the roller bearing element 34, a stop element 35 is disposed at the end of the first arm portion 29. The tracking arm structure 3 further comprises measuring means 36 with the aid of which the distance and/or the shifting movement of the tracking means 22 relative to the vehicle can be determined. The measuring means 36 comprise a pivotable arm structure 37 which comprises a second arm portion 38 and a third arm portion 39 that are pivotably connected with each other, and which is pivotably connected at one end with the tracking means 22 and at the other end with the roller bearing element 34. At the place where the pivotable arm structure 37 is pivotably connected with the roller bearing element 34, the angular rotation of the third arm portion 39 about the vertical axis 41 can be determined by means of third angle measuring means 40. By means of said angular rotation it is possible to determine the distance and/or the shifting movement of the tracking means 22 relative to the vehicle 1, 10, and to control same, on the basis of the signals from the angle measuring means 21, 31, 33, 36, 40 and the signals from the load cell 18, in such a manner that the vehicles 1, 10 follow the guide elements 4.

It will be recognized that these embodiments are susceptible to various modifications and alternative forms well known to those of skill in the art. For example, while the present embodiment envisages a pair of vehicles carrying the demarcating element, this may be carried by a single vehicle rotating about a central point. Furthermore, while wheeled vehicles have been depicted, other forms of vehicles using tracks or the like may also be envisaged.

Many modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A tracking vehicle for supporting a demarcating element for demarcating an area, the tracking vehicle comprising a tracking arm structure for tracking a guide wire disposed in or adjacent to the area, wherein a tension force is exerted by the demarcating element on the tracking vehicle in a lateral direction generally perpendicular to the guide wire, wherein the tracking arm structure comprises a freely moveable tracking element that is not biased against the guide wire in the lateral direction and wherein an electronic controller is arranged to determine the relative position of the tracking element with respect to the vehicle and to control a direction of movement of the vehicle in response to the relative position.

2. The vehicle as claimed in claim 1, wherein the vehicle has a length in the direction of the guide wire and the tension force is exerted at an equilibrium position along the length of the vehicle.

3. The vehicle as claimed in claim 1, wherein the vehicle is supported by a plurality of cage wheels, a running surface of the cage wheels being constituted by spaced apart, circularly curved strips.

4. The vehicle as claimed in claim 3, the vehicle comprising two pairs of cage wheels that are drivable independently of each other, each pair of cage wheels comprising a drive chain.

5. The vehicle as claimed in claim 1, further comprising a reel driven by an electric motor for rolling and unrolling the demarcating element, and in that the reel is connected with the vehicle in a first suspension point by means of a load cell and is connected with the vehicle in a second suspension point by means of a leaf spring.

6. The vehicle as claimed in claim 5, wherein the vehicle comprises a guiding piece that is rotatable about a vertical axis and along which the demarcating element is guided to the reel.

7. The vehicle as claimed in claim 1, wherein the tracking element engages the guide wire at least two spaced apart points of engagement.

8. The vehicle as claimed in claim 7, wherein, at said points of engagement, the tracking element comprises bracket-shaped elements for enclosing the guide wire.

9. The vehicle as claimed in claim 8, wherein each of the bracket-shaped elements is provided at its lower side with a closing element that can be opened against spring action.

10. The vehicle as claimed in claim 7, wherein the tracking arm structure, is provided with one or more location determining sensors or approach sensors.

11. The vehicle as claimed in claim 7, wherein the tracking arm structure comprises a first arm portion that is connected with a frame of the vehicle so as to be rotatable about a horizontal axis.

12. The vehicle as claimed in claim 11, wherein the tracking arm structure comprises a first angle measuring device for measuring an angular rotation of the first arm portion relative to a horizontal axis.

13. The vehicle as claimed in claim 12, wherein the tracking element is connected with an end of the first arm portion so as to be rotatable about a first vertical axis.

14. The vehicle as claimed in claim 13, wherein the tracking arm structure comprises a second angle measuring device for measuring an angular rotation of the tracking element relative to the first vertical axis.

15. The vehicle as claimed in claim 11, wherein the first arm portion is connected with the frame of the vehicle to be extendable.

16. The vehicle as claimed in claim 15, wherein the tracking arm structure comprises a distance measuring device for measuring the distance or extension of the tracking element relative to the vehicle.

17. The vehicle as claimed in claim 16, wherein the distance measuring device comprises a third angle measuring device.

18. The vehicle as claimed in claim 1, wherein the vehicle is an unmanned vehicle.

19. The vehicle as claimed in claim 1 in a system for demarcating an area, the system further comprising a second vehicle, wherein the demarcating element is connected in tension between the tracking vehicle and the second vehicle.

20. The system as claimed in claim 19, wherein the second vehicle comprises a second guiding piece that is rotatable about a vertical axis.

21. The system as claimed in claim 20, wherein the second guiding piece comprises a break-back device to which the demarcating element is attachable.

22. The system as claimed in claim 21, wherein the break-back device is a spring break-back device comprising a helical bending spring with a circular section.

23. The system as claimed in claim 20, wherein the second guiding piece comprises a load cell.

24. The system as claimed in claim 20, wherein the second guiding piece comprises an angle measuring instrument with the aid of which the angular rotation about the vertical axis can be determined.

25. The system as claimed in claim 19, further comprising a second guide wire disposed in or adjacent to the area, wherein the second vehicle also comprises a freely movable tracking arm structure for tracking the second guide wire.

26. The system as claimed in claim 19, wherein the tracking arm structure of the first vehicle or the second vehicle is provided with protection means to put the vehicle out of operation or generate an alarm when the tracking arm structure does not co-operate correctly with the respective guide wire.

27. An unmanned tracking vehicle comprising a tracking arm structure for tracking a guide wire, the tracking arm structure comprising a tracking element for engaging the guide wire, the tracking element being non-actuated and freely movable with respect to the vehicle, the vehicle further comprising a controller for determining the relative position of the tracking element with respect to the vehicle and for controlling a direction of movement of the vehicle in response to the relative position.

28. The vehicle as claimed in claim 27, further comprising left and right independently driven wheels, wherein the controller steers the vehicle by individually controlling the left and right wheels.

* * * * *